Oct. 3, 1950        E. G. STAUDE        2,524,682
PRESSURE FLUID POWER AMPLIFIER
Filed Nov. 26, 1947        3 Sheets-Sheet 1
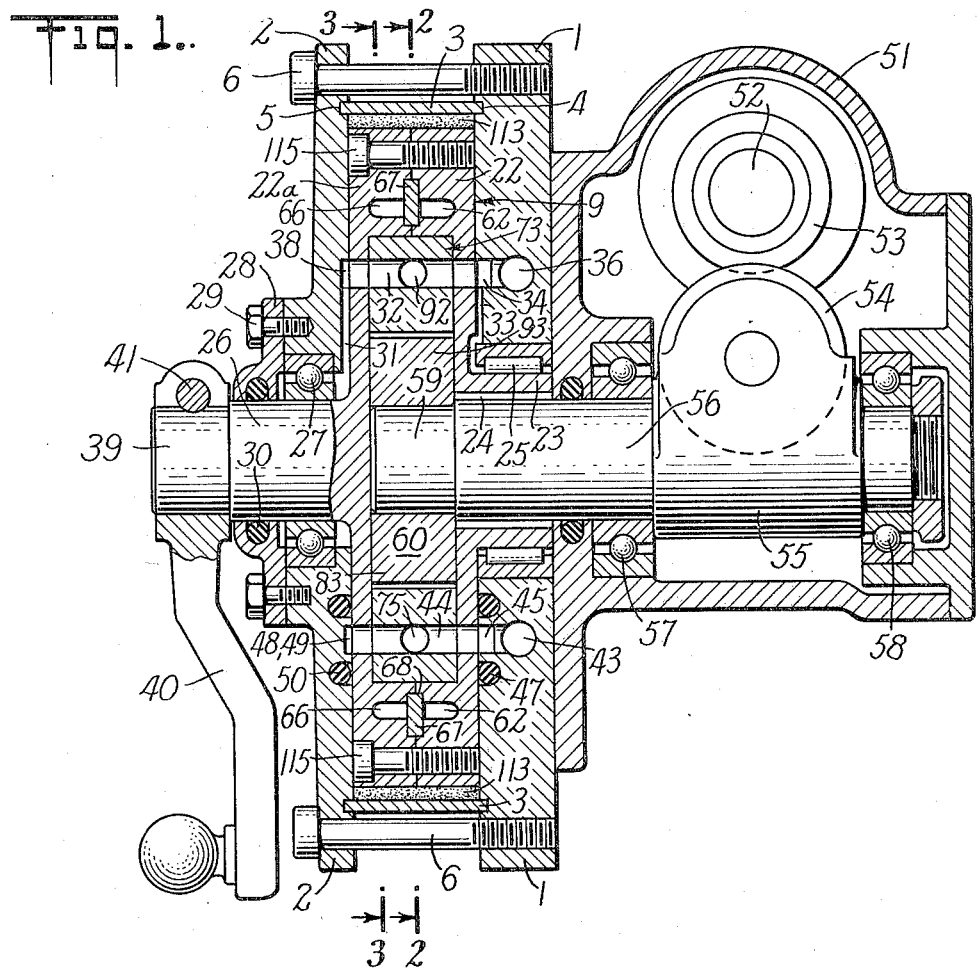
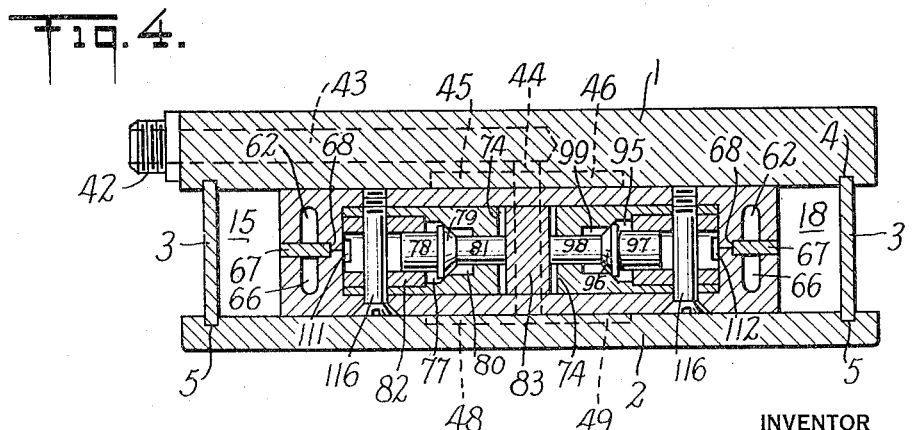
INVENTOR
*Edwin G. Staude*
BY
ATTORNEY

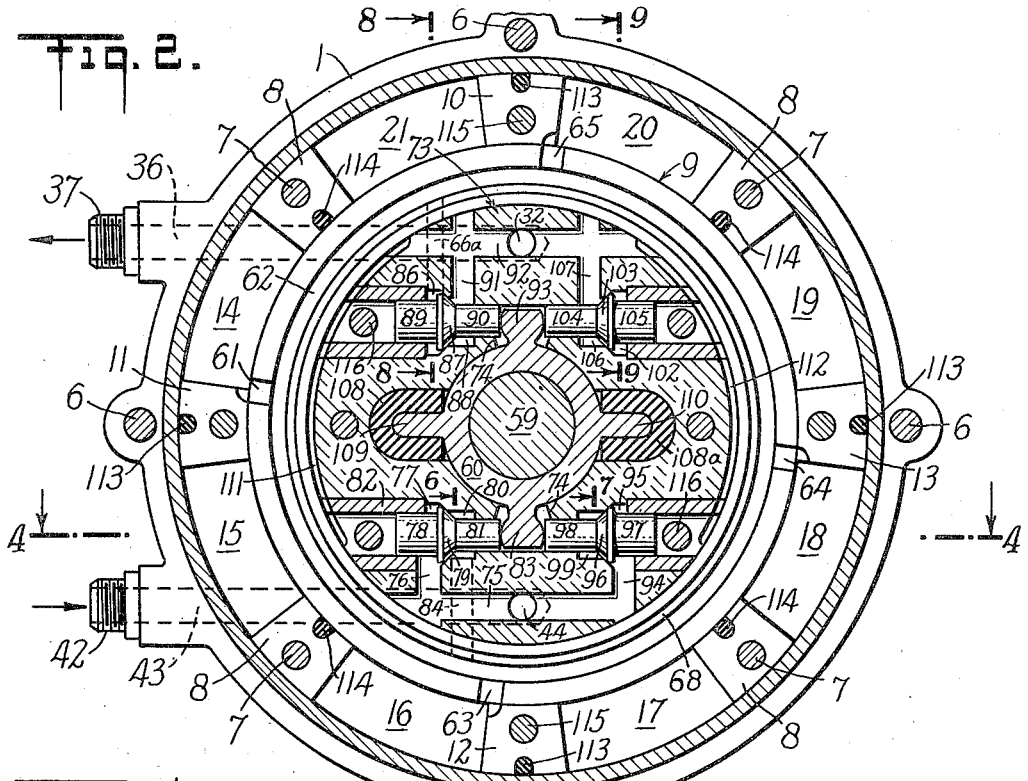

Oct. 3, 1950 E. G. STAUDE 2,524,682
PRESSURE FLUID POWER AMPLIFIER
Filed Nov. 26, 1947 3 Sheets-Sheet 3
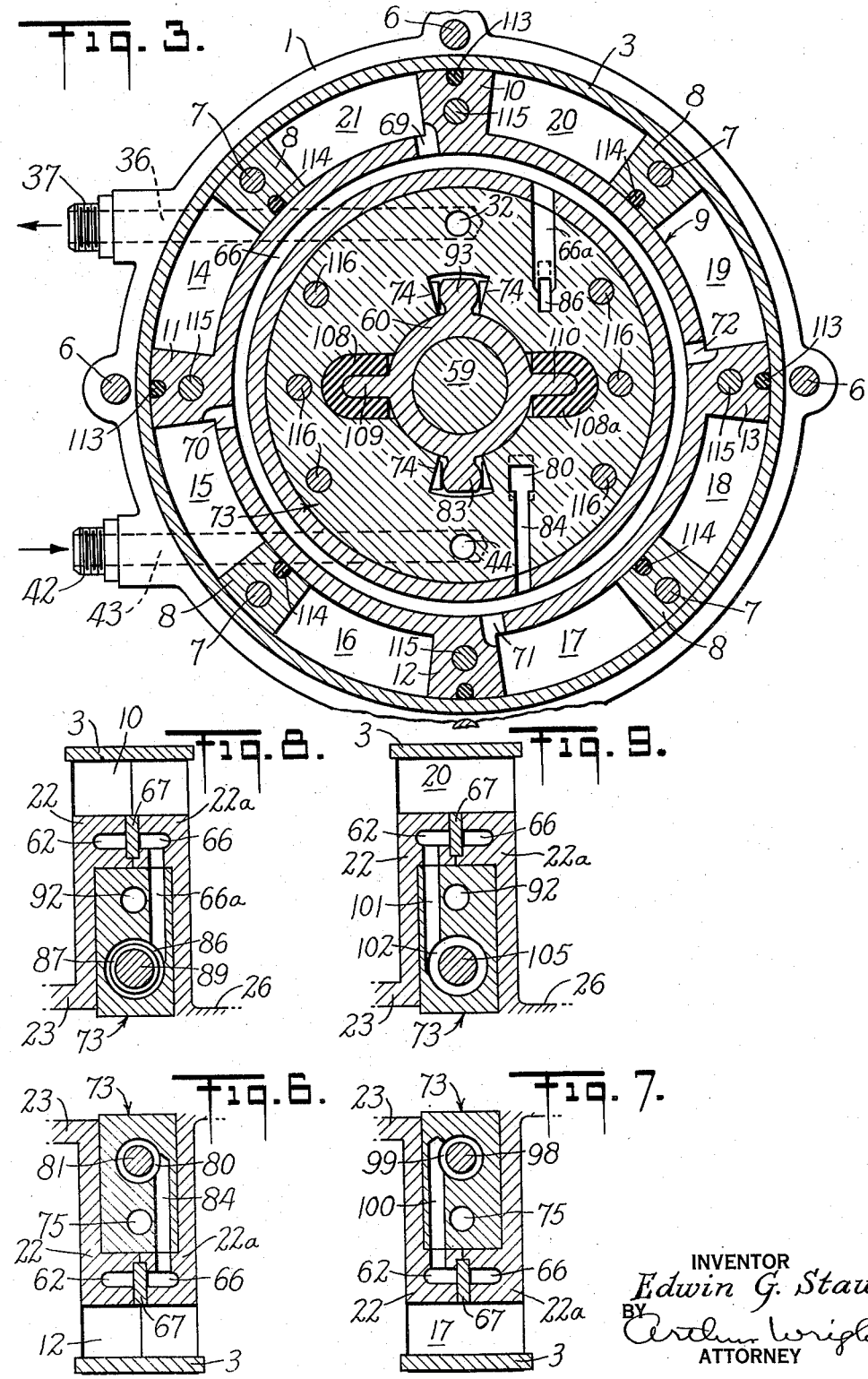
INVENTOR
Edwin G. Staude
BY
Arthur Wright
ATTORNEY Patented Oct. 3, 1950

2,524,682

UNITED STATES PATENT OFFICE 2,524,682

PRESSURE FLUID POWER AMPLIFIER

Edwin G. Staude, Minneapolis, Minn.

Application November 26, 1947, Serial No. 788,245

16 Claims. (Cl. 121—41)

My invention relates particularly to a power amplifier operated by fluid pressure, adapted for the application of power for work performance generally, but which is applicable especially for the operation in the steering of automotive vehicles such, for example, as automobiles.

The important purpose in a fluid power amplifier should be to obtain dependable instant response, as free as possible from failure of operation, while having economy in operation, low cost of construction, light weight and relatively small size. The power amplifier made in accordance with my invention definitely fulfills these exacting requirements.

Care has been exercised to avoid all loose flexible connections, without sacrificing any desirable feature of the construction.

An exceptionally short distance has been attained, also, between the static power applied and the work to be performed, in my power amplifier. Further I have found that high fluid pressures, for instance 500 p. s. i., flow through a passage at much greater velocity than a considerably lower pressure and, therefore, for the same quick response a much smaller passage area can be used in accordance with my invention. Accordingly, I have found that a $\frac{5}{16}$ inch round inside diameter passage is ample for the fluid pressure intake to supply, with instant response, a 4½ square inch total vane area, when operating on an average vane radius of 3½ inches. Also, there may be used four vanes, each of the same being, for instance, 1½ inches wide by ¾ inches high. This means that such a unit, for example at 500 p. s. i., although any other pressure may be used, will deliver a torque of 7875 inch pounds on the output shaft.

There may be, for example, two forms of this structure for power amplification to suit different conditions. One of these is where the pressure is retained, thus locking the vanes when the valve controlling means is released and in which pressure will be released only if the valve controlling means is moved in the opposite direction. This form is desirable for most air craft controls where the servo is required to follow the movement of the controlling valve and keep the control locked at all times against independent movement. The other form is where the pressure on the vanes is released instantly when the effort exerted on the valve controlling means is released. This latter form is particularly useful in power steering where castering of the front wheels is desirable to permit the car to again assume a straight ahead position automatically. This is accomplished by normally keeping both outlet ports open and only closing either one of the outlet valves before the fluid pressure enters the particular passage leading thereto. This is accomplished by making the valve stems on the outlet valves a little longer and the valve stems on the inlet passage a little shorter so that motion by the valve controlling member will act to close the particular outlet passage before the corresponding inlet passage opens.

Further objects to to provide an enlarged plunger to reduce back pressure and to provide effective sealing means on the fluid intake.

Further objects will appear from the detailed description of my invention hereinafter.

While my invention is capable of embodiment in many different forms, for the purpose of illustration I have shown only certain forms of my invention in the accompanying drawings, in which—

Fig. 1 is a vertical cross section of my four vane fluid pressure power amplifier;

Fig. 2 is a longitudinal vertical section thereof taken on line 2—2 of Fig. 1;

Fig. 3 is a longitudinal vertical section thereof taken on line 3—3 of Fig. 1;

Fig. 4 is a horizontal section thereof taken on line 4—4 of Fig. 2;

Fig. 5 is an elevational view of one wall of the power amplifier, partly in section, showing the manner of sealing the pressure fluid against seepage;

Fig. 6 is a vertical sectional detail taken on line 6—6 of Fig. 2;

Fig. 7 is a vertical sectional detail taken on line 7—7 of Fig. 2;

Fig. 8 is a vertical sectional detail taken on line 8—8 of Fig. 2;

Fig. 9 is a vertical sectional detail taken on line 9—9 of Fig. 2; and

Fig. 10 is a vertical cross section of a modified form of the valve assembly showing a valve mechanism adapted for automatically releasing pressure when the valve controlling member is released.

In the drawings, referring first to Figs. 1 to 9, I have shown side walls 1 and 2 which form a casing in conjunction with an annular ring 3 located in grooves 4 in the wall 1 and 5 in the wall 2, and which are secured together by screws 6 and 7.

The screws 7 also serve to locate and secure in place chamber dividers 8, each of which is divided transversely into two pieces, for convenience in assembling.

Located between the side walls 1 and 2 and within the annular ring 3 there is an oscillating member 9 having vanes 10, 11, 12 and 13. These vanes divide the spaces within the annular ring 3 formed by the chamber dividers 8 into operating chambers 14, 15, 16, 17, 18, 19, 20 and 21.

The oscillating member 9 is made in two parts 22 and 22a. The member 22 is provided with a hub 23 and a thin bushing 24. A roller bearing 25 fits over the hub 23 and is mounted in the wall 1. The member 22a is provided with a hub 26 which is supported in a ball bearing 27 mounted in the wall member 2. The bearing 27 is clamped in position by a cap 28 secured by cap screws 29. The usual low pressure fluid sealing ring 30 is also provided. The seepage which accumulates around the bearing 27 passes up through a narrow channel 31 and empties into a passage 32. A similar narrow channel 33 is provided in the wall member 1 which also connects any seepage around the bearing 25 with the passage 32 (see Fig. 5). The passage 32 has an arc relief 34, 35 in the wall member 1 so the passage 32 will not be obstructed as to a fluid outlet 36 which connects with the return to the source of supply through connections made with a nipple 37 when the member 9 oscillates (see Fig. 5). A similar relief 38, corresponding to the relief at 35 in the wall member, is provided in the wall member 2. The hub 26 has an extension 39 to which an arm 40 is secured for attachment of the device to be moved. The arm 40 is provided with a serrated inside which fits over the extension 39 and is secured in position by a clamping bolt 41. The inlet passage for the fluid under pressure is provided by means of a nipple 42 to a passage 43 which in turn connects with a passage 44. Because of the high pressure, for example of about 500 p. s. i., and in order to reduce seepage as much as possible, I provide first an arcuate recess 45, 46 in the wall member 1 (see Fig. 5) and around the recess 45, 46 I form a groove, which groove serves to retain a ring-shaped elastic packing ring 47, as, for example, made of rubber or a synthetic rubber substitute. On the opposite side in the wall member 2 I provide a similar arcuate recess 48, 49 and around this arc recess 48, 49 I form a groove, which groove serves to retain a round elastic packing ring 50. The arc groove 48, 49 is merely for the purpose of equalizing the pressure in the arc groove 45, 46 and as a precaution against seepage.

I have shown one form of my invention as applied to a standard type of steering mechanism 51, having the usual type steering shaft 52 operated by the usual hand wheel (not shown) and having a worm gear 53 secured to the steering shaft 52. An anti-friction worm wheel 54 co-operates with the gear teeth of the worm gear 53 and serves to oscillate a member 55 which is part of an output power shaft 56 mounted in bearings 57 and 58. The shaft 56 telescopes into the hub 23 and provides a further bearing in connection with the thin bushing 24. An extension 59 is provided on the end of the shaft 56. This extension has a serrated surface over which fits a valve controlling member 60. The mechanism just described shows how the valve member 60 is controlled by the steering wheel (not shown). A passage 61 connects an annular passage 62 in the oscillating member 22 with the operating chamber 14, a passage 63 connects it with the operating chamber 16, a passage 64 connects it with the operating chamber 18, and a passage 65 connects it with the operating chamber 20. All of these, thus, connect with the annular passage 62, which when under fluid pressure will cause the unit to operate in an anti-clockwise direction. For clockwise operation thereof the pressure is directed, instead, through an annular passage 66. In order to separate the two annular passages 61 and 66 I provide an annular plate or ring 67 which is clamped to fit between the members 22 and 22a so as to locate the same in a small recess 68, one half of which is in the member 22 and the other half in the member 22a.

Referring to Figs. 1, 4, 6, 7, 8 and 9, it will be noted that the ring 67 closes off the passage 61 from the passage 66. Passage connections from the annular passage 66 to the operating chambers are provided by a passage 69 which connects the chamber 21 with the annular passage 66, a passage 70 which connects with the chamber 15, a passage 71 which connects with the chamber 17, and a passage 72 which connects with the chamber 19 (see Fig. 3). In order to control the flow of the fluid under pressure to the various operating chambers, four poppet valves are provided, which are operable independently of each other, said valves comprising two inlet and two outlet valves, all operated by a single valve controlling member and mounted within a separate assembly unit 73 to facilitate manufacture and assembly. Suitable stops 74 are provided within the member 73 so that the maximum movement of the valve member 60 will engage the stops 74 and operate the power amplifier manually in the event that the fluid pressure fails. The member 22 is provided with the annular passage 62 and is connected with the inlet and outlet passages as hereinafter described. The annular passage 66 also connects with the fluid pressure inlet passage 44 by a passage 75, 76 to a round chamber 77 which contains a large diameter short plunger or guide 78 on a peripheral tapered flange inlet valve 79. The large diameter of the plunger 78 leaves only a small back pressure area on the adjacent face of the flange valve 79. The inlet valve 79 blocks the flow of fluid from the passage 44 through the passage 76 which connects with the chamber 77. On the opposite side of the valve 79 there is a chamber 80 through which a smaller diameter short plunger 81 of the valve 79 passes. The bearing for the smaller diameter plunger 81 is the member 73 and the bearing for the larger diameter plunger 78 is in a sleeve 82 which is pressed into a round bore in the member 73 against a small shoulder for the location thereof. The purpose of the relatively large plunger 78 is to reduce the back pressure against the valve 79 by reducing the area against which pressure against the valve 79 acts to a minimum of approximately not over five pounds, in this example of my invention, depending upon the exposed surface. No springs are required to keep any of the valves closed because they all operate against pressure which keeps the valves urged towards their seats. The same reason for the enlarged plungers on the pressure side of the valves applies to all the valves. The valve 79 is raised from its seat by a projection 83 of the valve operating member 60 bearing against the plunger 81 so that fluid under pressure can pass from the chamber 80 through a passage 84 into the annular passage 66 (see Fig. 6). For exhausting the fluid from the annular passage 66 I provide a passage 66a (see Fig. 8) connecting the annular passage 66 with a chamber 86. An upper valve 87 blocks the flow of the fluid into a valve chamber 88. The said valve 87 is provided with plunger guides 89 and 90 and the chamber 86 connects with the outlet passage 32 by passages 91 and 92. A projection 93 of the valve operating member 60, bearing against the plunger 90, opens the valve 87 when operated in anti-clockwise direction. The path of the fluid to the annular passage 62 from the inlet passages 44 and 75 is as follows: A passage 94 connects with a chamber 95 (see Fig. 2). The chamber 95 is provided with a valve 96 which valve has plunger guides 97 and 98. The valve 96 controls the passage of fluid under pressure to a chamber 99. The chamber 99 is connected by a passage 100 to the annular passage 62 (see Fig. 7). When the projection 83 of the valve operating member 60 bears against the plunger 98 sufficiently to raise the valve against the fluid pressure the fluid flows into the chamber 99 and then through the passage 100 into the annular passage 62. For exhausting the fluid from the annular passage 62, a passage 101 connects the annular passage 62 with a chamber 102 (see Fig. 9). Within the chamber 102 there is a valve 103 having guide plungers 104 and 105. On the opposite side of the valve 103 there is a chamber 106 into which fluid can only flow if the valve 103 is raised from its seat by pressure from the projection 93 of the valve controlling member 60, against the plunger 104. The chamber 106 is connected with the outlet passages 32 and 92 by a passage 107. The valve member 60 is kept in the central or neutral position shown in Fig. 2 by two bodies of U-shaped resilient material, such as rubber or a synthetic rubber substitute, 108 and 108a which are packed around projections 109 and 110, respectively, that engage the resilient material the full width of the projection 83 on the valve controlling member 60. Narrow passages 111 and 112 to low pressure act as vents or breathers for the plungers 38 and 89 and 97 and 105 (see Figs. 2 and 4). In the vanes, I have shown a round resilient packing 113 between the vane and the annular ring 3 and a round resilient packing 114 between the spacer 8 and the oscillating member 9. The two oscillating member halves 22 and 22a, together with the member 73 located between, are bolted together by bolts 115 through the vanes and bolts 116 connecting the members 22 and 22a with the member 73 against separate movement. All of the bolts may be secured by riveting or prick punching the ends.

In Fig. 10, which comprises a slight modification, I have shown the valves 87 and 103 in the open position, which is accomplished by providing slightly increased lengths of plungers 90' and 104'. Plungers 81 and 98 of the inlet valves 79 and 96 are also slightly shortened to provide some lost motion so that in oscillating the valve controlling member 60 the valves 87 and 103 will close before the desired inlet valve opens. The reason for the arrangement shown in Fig. 10 is in order to release the pressure automatically when the valve controlling member 60 no longer follows up, so that for power steering purposes the ground wheels can caster and assume a straight ahead position when the manual steering wheel is released. This releasing feature is practicable particularly in certain installations, because for air craft, the controls must be kept in locked position responsive only to the position of the valve controlling means which results from the valve position in Fig. 2. Preferably, there is always some lost motion between the projection 93 and the plungers 90 and 104 to insure the positive seating of the valves 87 and 103. There is, however, more lost motion between the projection 83 and the plungers 81 and 98 to permit the partial opening of the valve 87 or 103 before the fluid pressure is released by the valve 78 or 96, respectively.

The operation of my device is as follows: For power effort, to exert a movement anti-clockwise, the shaft 56 is moved anti-clockwise so that by means of the extension 59 the valve control member 60 is also moved anti-clockwise, causing the projection 83 to bear against the plunger 98 so as to lift the valve 96 from its seat and permit fluid under pressure to enter the small chamber 99, from which the fluid under pressure flows through the passage 100 into the annular passage 62 (see Fig. 7). While the fluid under pressure in the annular passage 62 flows down the passage 101 into the small chamber 102 the projection 93 keeps the valve 103 closed to the outlet passage 107. Therefore, the fluid must flow out through the passages 61, 63, 64 and 65 and move the vanes 10, 11, 12 and 13 anti-clockwise.

In order to release the fluid on the opposite side of the vanes the projection 93 is moved to open the valve 87 so the fluid in the chambers 15, 17, 19 and 21 can flow out through the passages 69, 70, 71 and 72 into the annular passage 66 and from there out through the passage 66a into the small valve chamber 88 past the open valve 87, then into the passages 91 and 92 and out through the passage 32 into the return passages 34, 35 and 36.

For clockwise motion the operation is reversed. The valve 87 is opened by movement of the projection 83 and the fluid under pressure flows into the small chamber 80, through the passage 84 into the annular passage 66 (see Fig. 6).

The fluid then flows down the passage 66a into the small chamber 86 where it is blocked by the valve 87, thence out through the passages 69, 70, 71 and 72 to move the vanes clockwise.

In this instance, the projection 93 has opened the valve 103 to permit exhausting the fluid in the chambers 14, 16, 18 and 20 into the annular passage 62 and out through the passage 101 into the chamber 102 past the open valve 103 into the small chamber 102 and out through the passage 107 into the passages 92 and 32 and out through the passages 34, 35 and 36.

The slightly modified form shown in Fig. 10 operates in the same manner except that with the outlet valve-operating plungers 90' and 104' being longer than the inlet valve-operating plungers 81 and 88, the fluid pressure is released automatically so that the ground wheels can caster and assume a straight ahead position when the manual steering wheel on the column 52 is released.

While I have described my invention above in detail I wish it to be understood that many changes may be made therein without departing from the spirit of the same.

For example, while I have shown my fluid power amplifier as applied for power steering of motor vehicles and as controlled by the usual manually operated steering wheel, it is to be understood that I may also dispense with this remote control and attach any other form of actuator directly to the shaft 56 so as to control the valve controlling member 60 directly by the manual effort, depending on the purpose for which the servo mechanism is to be used.

The manually operated steering unit to which my invention is applied in the drawings is, for instance, a speed reducing mechanism, and such speed reducing mechanism may, also, be desirable for other power control applications where amplified power output is desired.

I claim:

1. A double acting fluid power amplifier having a source of fluid pressure, a fluid connection thereto, a plurality of compartments, rotatable walls arranged to be moved by said fluid pressure therein and which are connected together, a member connecting said walls to a work performing element, passages leading from the source of fluid pressure to said walls, plural poppet valves in said passages located inside the path of said walls for controlling the application of said fluid pressure to each of said walls by obstructing the movement of the liquid in said passages and controlling the pressure acting against the walls to cause movement of said walls in the direction desired, and manually operable rotatable means located in the center of said path including reversible valve-operating mechanism operable in either direction from an initial inactive position for operating said valves and controlling the application of said fluid pressure to said movable walls.

2. A double acting fluid power amplifier having a source of fluid pressure, a fluid connection thereto, eight compartments, four rotatable walls arranged to be moved by said fluid pressure so that each wall moves in one of four pairs of said compartments and which are connected together, a member connecting said walls to a work performing element, passages leading from the source of fluid pressure to said walls, four poppet valves in said passages located inside the path of said walls for controlling the application of said fluid pressure to each of said walls by obstructing the movement of the liquid in said passages and controlling the pressure acting against the walls to cause movement of said walls in the direction desired, and manually operable rotatable means located in the center of said path including reversible valve-operating mechanism operable in either direction from an initial inactive position for operating said valves and controlling the application of said fluid pressure to said movable walls.

3. A double acting fluid power amplifier having a source of fluid pressure, a fluid connection thereto, eight compartments, four rotatable walls arranged to be moved by said fluid pressure so that each wall moves in one of four pairs of said compartments and which are connected together, a member connecting said walls to a work performing element, passages leading from the source of fluid pressure to said walls, four poppet valves in said passages located inside the path of said walls for controlling the application of said fluid pressure to each of said walls by obstructing the movement of the liquid in said passages and controlling the pressure acting against the walls to cause movement of said walls in the direction desired, manually operable rotatable means located in the center of said path including reversible valve-operating mechanism operable in either direction from an initial inactive position for operating said valves and controlling the application of said fluid pressure to said movable walls, and stationary partitions located between each of said pairs of compartments.

4. A double acting fluid power amplifier having a source of fluid pressure, a fluid connection thereto, a plurality of compartments, rotatable walls arranged to be moved by said fluid pressure therein and which are connected together, a member connecting said walls to a work performing element, passages leading from the source of fluid pressure to said walls, plural poppet valves in said passages located inside the path of said walls for controlling the application of said fluid pressure to each of said walls by obstructing the movement of the liquid in said passages and controlling the pressure acting against the walls to cause movement of said walls in the direction desired, and manually operable rotatable means located in the center of said path including reversible rotary valve-operating mechanism with a pair of diametrically opposed yielding stops operable in either direction from an initial inactive position for operating said valves and controlling the application of said fluid pressure to said movable walls.

5. A double acting fluid power amplifier having a source of fluid pressure, a fluid connection thereto, a plurality of compartments, rotatable walls arranged to be moved by said fluid pressure therein and which are connected together, a member connecting said walls to a work performing element, passages leading from the source of fluid pressure to said walls, plural plunger operated poppet valves, having tapered valve flanges, in said passages located inside the path of said walls for controlling the application of said fluid pressure to each of said walls by obstructing the movement of the liquid in said passages and controlling the pressure acting against the walls to cause movement of said walls in the direction desired, and manually operable rotatable means located in the center of said path including reversible valve-operating mechanism operable in either direction from an initial inactive position for operating said valves and controlling the application of said fluid pressure to said movable walls.

6. A double acting fluid power amplifier having a source of fluid pressure, a fluid connection thereto, a plurality of compartments, rotatable walls arranged to be moved by said fluid pressure therein and which are connected together, a member connecting said walls to a work performing element, passages leading from the source of fluid pressure to said walls, plural plunger operated valves, having tapered valve flanges, in said passages located inside the path of said walls for controlling the application of said fluid pressure to each of said walls by obstructing the movement of the liquid in said passages and controlling the pressure acting against the walls to cause movement of said walls in the direction desired, and manually operable rotatable means located in the center of said path including reversible valve-operating mechanism operable in either direction from an initial inactive position for operating said valves and controlling the application of said fluid pressure to said movable walls, each of said valve plungers comprising guide plungers on opposite sides of its tapered valve flange, one of which plungers is of small diameter for operation by said valve operating mechanism and the other of which is of larger diameter so as to leave a narrower adjacent portion of the valve flange subject to back fluid pressure than on the other side of said valve flange.

7. A double acting fluid power amplifier having a source of fluid pressure, a fluid connection thereto, a plurality of compartments, rotatable walls arranged to be moved by said fluid pressure therein and which are connected together, a member connecting said walls to a work performing element, passages leading from the source of fluid pressure to said walls, plural plunger operated valves, having tapered valve flanges, in said passages located inside the path of said walls for controlling the application of said fluid pressure to each of said walls by obstructing the movement of the liquid in said passages and controlling the pressure acting against the walls to cause movement of said walls in the direction desired, and manually operable rotatable means located in the center of said path including reversible valve-operating mechanism operable in either direction from an initial inactive position for operating said valves and controlling the application of said fluid pressure to said movable walls, each of said valve plungers comprising guide plungers on opposite sides of its tapered valve flange, said guide plungers having lengths not more than the approximate diameter of the valve on which they are carried.

8. A double acting fluid power amplifier having a source of fluid pressure, a fluid connection thereto, a plurality of compartments, rotatable walls arranged to be moved by said fluid pressure therein and which are connected together, a member connecting said walls to a work performing element, passages leading from the source of fluid pressure to said walls, plural plunger operated valves, having tapered valve flanges, in said passages located inside the path of said walls for controlling the application of said fluid pressure to each of said walls by obstructing the movement of the liquid in said passages and controlling the pressure acting against the walls to cause movement of said walls in the direction desired, and manually operable rotatable means located in the center of said path including reversible valve-operating mechanism operable in either direction from an initial inactive position for operating said valves and controlling the application of said fluid pressure to said movable walls, each of said valve plungers comprising guide plungers on opposite sides of its tapered valve flange, one of which plungers is of small diameter for operation by said valve operating mechanism and the other of which is of larger diameter so as to leave a narrower adjacent portion of the valve flange subject to back fluid pressure than on the other side of said valve flange, said guide plungers having lengths not more than the approximate diameter of the valve on which they are carried.

9. A double acting fluid power amplifier having a source of fluid pressure, a fluid connection thereto, a plurality of compartments, rotatable walls arranged to be moved by said fluid pressure therein and which are connected together, a member connecting said walls to a work performing element, passages leading from the source of fluid pressure to said walls, plural plunger operated inlet and outlet valves, having tapered valve flanges, in said passages located inside the path of said walls for controlling the application of said fluid pressure to each of said walls by obstructing the movement of the liquid in said passages and controlling the pressure acting against the walls to cause movement of said walls in the direction desired, one of which plungers is also for valve operation thereby, and manually operable rotatable means located in the center of said path including reversible valve-operating mechanism operable in either direction from an initial inactive position for operating said valves and controlling the application of said fluid pressure to said movable walls, each of said valve plungers comprising guide plungers on opposite sides of its tapered valve flange, the valve operating outlet valve plungers being longer than the valve operating inlet plungers so as to normally keep the outlet valves open and release the fluid pressure when the manual operating means is released.

10. A double acting fluid power amplifier having a source of fluid pressure, a fluid connection thereto, a plurality of compartments, rotatable walls arranged to be moved by said fluid pressure therein and which are connected together, a member connecting said walls to a work performing element, passages leading from the source of fluid pressure to said walls, plural plunger operated inlet and outlet valves, having tapered valve flanges, in said passages located inside the path of said walls for controlling the application of said fluid pressure to each of said walls by obstructing the movement of the liquid in said passages and controlling the pressure acting against the walls to cause movement of said walls in the direction desired, one of which plungers is also for valve operation thereby, and manually operable rotatable means located in the center of said path including reversible valve-operating mechanism operable in either direction from an initial inactive position for operating said valves and controlling the application of said fluid pressure to said movable walls, each of said valve plungers comprising guide plungers on opposite sides of its tapered valve flange, one of which plungers is of small diameter for operation by said valve operating mechanism and the other of which is of larger diameter so as to leave a narrower adjacent portion of the valve flange subject to back fluid pressure than on the other side of said valve flange, the valve operating outlet valve plungers being longer than the valve operating inlet plungers so as to normally keep the outlet valves open and release the fluid pressure when the manual operating means is released.

11. A double acting fluid power amplifier having a source of fluid pressure, a fluid connection thereto, a plurality of compartments, rotatable walls arranged to be moved by said fluid pressure therein and which are connected together, a member connecting said walls to a work performing element, passages leading from the source of fluid pressure to said walls, plural plunger operated inlet and outlet valves, having tapered valve flanges, in said passages located inside the path of said walls for controlling the application of said fluid pressure to each of said walls by obstructing the movement of the liquid in said passages and controlling the pressure acting against the walls to cause movement of said walls in the direction desired, one of which plungers is also for valve operation thereby, and manually operable rotatable means located in the center of said path including reversible valve-operating mechanism operable in either direction from an initial inactive position for operating said valves and controlling the application of said fluid pressure to said movable walls, each of said valve plungers comprising guide plungers on opposite sides of its tapered valve flange, said guide plungers having lengths not more than the approximate diameter of the valve on which they are carried, the valve operating outlet valve plungers being longer than the valve operating inlet plungers so as to normally keep the outlet valves open and release the fluid pressure when the manual operating means is released.

12. A double acting fluid power amplifier having a source of fluid pressure, a fluid connection thereto, a plurality of compartments, rotatable walls arranged to be moved by said fluid pressure therein and which are connected together, a member connecting said walls to a work performing element, passages leading from the source of fluid pressure to said walls, plural plunger operated inlet and outlet valves, having tapered valve flanges, in said passages located inside the path of said walls for controlling the application of said fluid pressure to each of said walls by obstructing the movement of the liquid in said passages and controlling the pressure acting against the walls to cause movement of said walls in the direction desired, one of which plungers is also for valve operation thereby, and manually operable rotatable means located in the center of said path including reversible valve-operating mechanism operable in either direction from an initial inactive position for operating said valves and controlling the application of said fluid pressure to said movable walls, each of said valve plungers comprising guide plungers on opposite sides of its tapered valve flange, one of which plungers is of small diameter for operation by said valve operating mechanism and the other of which is of larger diameter so as to leave a narrower adjacent portion of the valve flange subject to back fluid pressure than on the other side of said valve flange, said guide plungers having lengths not more than the approximate diameter of the valve on which they are carried, the valve operating outlet valve plungers being longer than the valve operating inlet plungers so as to normally keep the outlet valves open and release the fluid pressure when the manual operating means is released.

13. A double acting fluid power amplifier having a source of fluid pressure, a fluid connection thereto, a plurality of compartments, rotatable walls arranged to be moved by said fluid pressure therein and which are connected together, a member connecting said walls to a work performing element, passages leading from the source of fluid pressure to said walls, plural poppet valves in said passages located inside the path of said walls for controlling the application of said fluid pressure to each of said walls by obstructing the movement of the liquid in said passages and controlling the pressure acting against the walls to cause movement of said walls in the direction desired, and manually operable rotatable means located in the center of said path including reversible valve-operating mechanism operable in either direction from an initial inactive position for operating said valves independently of each other and controlling the application of said fluid pressure to said movable walls.

14. A double acting fluid power amplifier having a source of fluid pressure, a fluid connection thereto, eight compartments, four rotatable walls arranged to be moved by said fluid pressure so that each wall moves in one of four pairs of said compartments and which are connected together, a member connecting said walls to a work performing element, passages leading from the source of fluid pressure to said walls, four poppet valves in said passages located inside the path of said wall for controlling the application of said fluid pressure to each of said walls by obstructing the movement of the liquid in said passages and controlling the pressure acting against the walls to cause movement of said walls in the direction desired, and manually operable rotatable means located in the center of said path including reversible valve-operating mechanism operable in either direction from an initial inactive position for operating said valves independently of each other and controlling the application of said fluid pressure to said movable walls.

15. A double acting fluid power amplifier having a source of fluid pressure, a fluid connection thereto, stationary walls enclosing partitions forming a plurality of compartments, an oscillating member carrying movable walls arranged to be moved by said fluid pressure therein and which are connected together, a member connecting said walls to a work performing element, passages leading from the source of fluid pressure to said walls and therefrom to said oscillating member by a sealed connection, plural valves in said passages for controlling the application of said fluid pressure to each of said walls by obstructing the movement of the liquid in said passages and controlling the pressure acting against the walls to cause movement of said walls in the direction desired, and manually operable means including reversible valve-operating mechanism operable in either direction from an initial inactive position for operating said valves and controlling the application of said fluid pressure to said movable walls.

16. A double acting fluid power amplifier having a source of fluid pressure, a fluid connection thereto, stationary walls enclosing partitions forming a plurality of compartments, an oscillating member carrying movable walls arranged to be moved by said fluid pressure therein and which are connected together, a member connecting said walls to a work performing element, passages leading from the source of fluid pressure to said walls and therefrom to said oscillating member by a sealed connection having an arcuate recess containing an enclosing ring-shaped flexible seal, plural valves in said passages for controlling the application of said fluid pressure to each of said walls by obstructing the movement of the liquid in said passages and controlling the pressure acting against the walls to cause movement of said walls in the direction desired, and manually operable means including reversible valve-operating mechanism operable in either direction from an initial inactive position for operating said valves and controlling the application of said fluid pressure to said movable walls.

EDWIN G. STAUDE.

REFERENCES CITED

The following references are of record in the file of this patent:

UNITED STATES PATENTS

| Number | Name | Date |
| --- | --- | --- |
| 639,673 | Dyblie | Dec. 19, 1899 |
| 1,301,757 | Steffes | Apr. 22, 1919 |
| 1,385,858 | Blasiar | July 26, 1921 |
| 1,570,097 | Sumner | Jan. 19, 1926 |
| 1,751,276 | Karibo | Mar. 18, 1930 |
| 1,788,378 | Bragg | Jan. 13, 1931 |
| 1,978,667 | Breese | Oct. 30, 1934 |
| 2,376,804 | Orshansky | May 22, 1945 |

FOREIGN PATENTS

| Number | Country | Date |
| --- | --- | --- |
| 354,327 | Great Britain | Aug. 4, 1931 |